United States Patent [19]

Hamada et al.

[11] 4,230,768
[45] Oct. 28, 1980

[54] LAMINATED LIGHT-POLARIZING SHEET

[75] Inventors: Hiroyuki Hamada; Rinjiro Ichikawa; Hajime Suzuki, all of Otsu, Japan

[73] Assignee: Toyo Boseki Kabushiki Kaisha, Japan

[21] Appl. No.: 25,234

[22] Filed: Mar. 29, 1979

[51] Int. Cl.² .......................... C09J 7/02; B32B 27/32; G02B 5/30
[52] U.S. Cl. .................................... 428/352; 350/149; 350/155; 428/412; 428/414; 428/415; 428/442; 428/476.1; 428/483; 428/510; 428/518; 428/519; 428/520; 428/910; 428/913; 428/354; 428/344; 428/423.7; 428/424.2
[58] Field of Search ................. 428/1, 412, 414, 442, 428/424, 518, 510, 520, 913, 352, 354, 519, 463, 415, 212, 483, 344, 476.1, 910; 525/192, 203, 206, 213, 227; 350/149, 155

[56] References Cited

U.S. PATENT DOCUMENTS

| | | | |
|---|---|---|---|
| 2,544,659 | 3/1951 | Dreyer | 428/1 X |
| 3,621,085 | 11/1971 | Ichikawa | 526/17 X |
| 3,850,790 | 11/1974 | Denervaud | 428/518 X |
| 3,908,052 | 9/1975 | Sanders | 428/1 |
| 3,941,901 | 3/1976 | Harsch | 428/1 |

*Primary Examiner*—Ellis P. Robinson
*Attorney, Agent, or Firm*—Jones, Tullar & Cooper

[57] ABSTRACT

A laminated light-polarizing sheet having an excellent humidity resistance with dimensional stability under a high humidity as well as an excellent light resistance comprising a light-polarizing film of a halogenated vinyl or vinylidene polymer containing polyene chains formed by partial dehydrohalogenation and a film or sheet of an acrylate or methacrylate polymer laminated on at least one surface of the light-polarizing film.

13 Claims, 2 Drawing Figures

LAMINATED LIGHT-POLARIZING SHEET

The present invention relates to a laminated light-polarizing sheet. More particularly, the laminated light-polarising sheet of the present invention has excellent humidity resistance with dimensional stability under high humidity as well as excellent light resistance and hardly crazes and wrinkles.

As a film having polarization efficiency, that is, a light-polarizing film, there have been known various films such as those of polyvinyl alcohol-iodine, polyvinyl alcohol-polyene, polyvinyl alcohol-dichromic dye and the like. However, since polyvinyl alcohol used as the base material is a hydrophilic polymer, these light-polarizing films lack humidity resistance.

We have previously developed a polyvinyl halidepolyene light-polarizing film so as to improve humidity resistance of a light-polarizing film (e.g. U.S. Pat. No. 3,621,085). This light polarizing film has excellent humidity resistance since the base material thereof is a hydrophobic polymer.

However, since these conventional light-polarizing films, including the above polyvinyl halide-polyene light-polarizing film, are formed into thin films by highly stretching in one direction, they are liable to be damaged by crazing, wrinkling or surface defects created in handling, crazing when cut in a direction at right angle to the stretching direction and the like.

For preventing these drawbacks, a cellulose film such as a cellulose triacetate film is laminated on a light-polarizing film in order to reinforce it. However, the laminated light-polarizing sheet, thus obtained, still has some drawbacks. For example, when a hydrophilic light-polarizing film is laminated, the resulting laminated light-polarizing sheet is hydrophilic and, when it is bonded to a glass plate, bubbles are produced at the bonded portion thereof at high humidity. Further, when the laminated sheet is kept under a high humidity, it swells due to water absorption and the edge portions thereof peel off. In case of a hydrophobic light-polarizing film, the light polarizing film has 0.07 to 0.4% water absorbing capacity, whereas a cellulose film such as a cellulose triacetate film is a hydrophilic film having 1.8 to 7.0% water absorbing capacity. When these two films are laminated, the hydrophobic light-polarizing film layer of the resulting laminated light-polarizing sheet crazes and wrinkles under high humidity, such as 80 to 90% RH, since it can not bear with swelling due to water absorption of the cellulose film laminated thereon.

Under these circumstances, we have intensively studied to obtain a laminated light-polarizing sheet without such drawbacks and have found that a laminated light-polarizing sheet having desired properties can be obtained by laminating a film or sheet of an acrylate or methacrylate polymer (hereinafter referred to as merely polyacrylate sheet) on a light-polarizing film of a halogenated vinyl or vinylidene polymer containing polyene chains formed by partial dehydrohalogenation.

The main object of the present invention is to provide a laminated light-polarizing sheet having excellent humidity resistance with dimentional stability at high humidity as well as excellent light resistance. Another object of the present invention is to provide a laminated light-polarizing sheet which hardly crazes and wrinkles. Other objects and advantages of the present invention will be apparent from the following description.

According to the present invention, the above and other objects are generally accomplished by providing a laminated light-polarizing sheet comprising a light-polarizing film of a halogenated vinyl or vinylidene polymer containing polyene chains formed by partial dehydrohalogenation and a polyacrylate sheet laminated on at least one surface of the light-polarizing film. The laminated light-polarizing sheet of the present invention has excellent dimensional stability since the water absorbing capacity of both the polyacrylate sheet and the light-polarizing film is low and the laminated sheet hardly swells, even if exposed to high humidity. Moreover, the light-polarizing film layer of the laminated sheet hardly crazes and breaks by swelling due to water absorption since the absorbing capacity of the polyacrylate sheet layer (0.09 to 0.4%) is similar to that of the light-polarizing film layer and there is little difference in the water absorbing capacity between these layers. Further, the polyacrylate sheet layer has optical uniformity and excellent transparency and the laminated light-polarizing sheet is not readily damaged since the mechanical properties of the polyacrylate sheet layer are tough and flexible.

Figure 1:
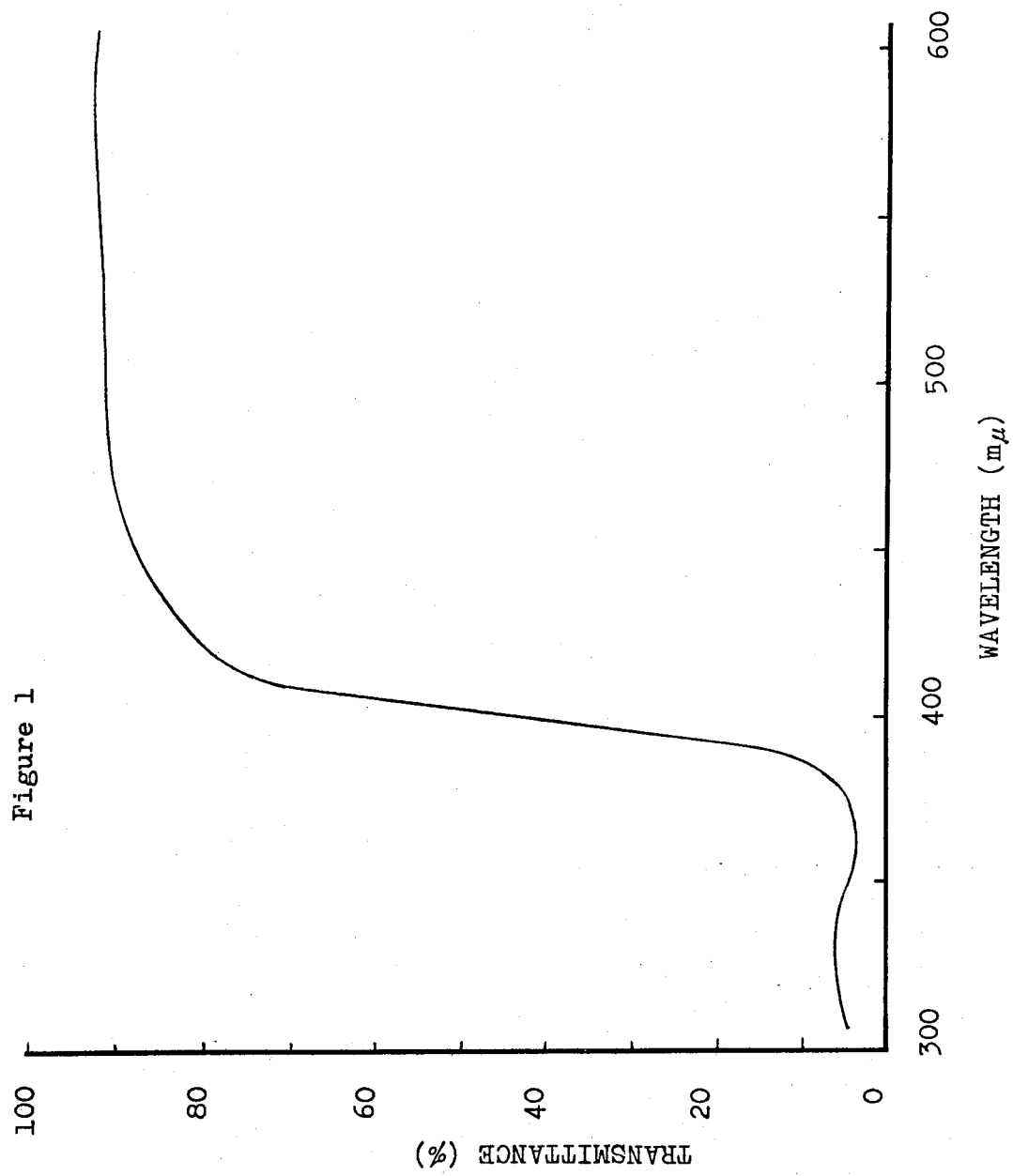
FIG. 1 demonstrates the percent transmittance of a laminate of the instant invention at various visible light wavelengths.

The light-polarizing film used in the present invention can be produced from a halogenated vinyl or vinylidene polymer according to the process disclosed in the above U.S. Pat. No. 3,621,085. For example, the light-polarizing film can be produced by partially dehydrohalogenating a film of a halogenated vinyl or vinylidene polymer in the presence of a basic compound, heating the film until it becomes blue to violet to form polyene chains therein and then stretching the film in one direction to unidirectionally orient the polyene chains. Alternatively, the light-polarizing film can be produced by partially dehydrohalogenating a halogenated vinyl or vinylidene polymer in the form of a solution in the presence of a basic compound, casting the resulting solution into a film, heating the film until the desired light absorption is observed within the visible light wavelength range, whereby polyene chains are formed, and then stretching the film in one direction to unidirectionally orient the polyene chains.

The halogenated vinyl or vinylidene polymer used in the production of the light-polarizing film is a homopolymer or a copolymer of a monomer of the formula:

in which X is halogen (preferably, chlorine or bromine); $R_1$ is hydrogen, —CN, —COOR$_2$, —OOCR$_3$ or an aryl having 6 to 10 carbon atoms (e.g. phenyl, naphthyl, etc.); $R_2$ is an alkyl having 1 to 10 carbon atoms; and $R_3$ is an alkyl having 1 to 10 carbon atoms, an aryl having 6 to 10 carbon atoms (e.g. phenyl, naphthyl, etc.) or a cycloalkyl having 5 to 10 carbon atoms (e.g. cyclohexyl, etc.). Typical examples of these polymers are a homopolymer or a copolymer of a vinyl halide and/or a vinylidene halide such as vinyl chloride, vinyl bromide, vinylidene chloride and the like. Further, the halogenated vinyl or vinylidene polymer includes a copolymer of the above monomer (I) and up to 90 mol % (based on all the structural units of the polymer) of another copolymerizable monomer, preferably, a monomer of the formula:

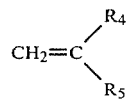
(II)

in which $R_4$ is hydrogen or an alkyl having 1 to 10 carbon atoms; $R_5$ is hydrogen, a hydrocarbon group having 1 to 10 carbon atoms such as an alkyl having 1 to 10 carbon atoms, an aryl having 6 to 10 carbon atoms (e.g. phenyl, naphtyl, etc.) or a cycloalkyl having 5 to 10 carbon atoms (e.g. cyclohexyl, etc.), a heterocyclic group having one or more hetero atoms selected from O, N and S (e.g. furfuryl, thienyl etc.) —CN, —COOR$_6$, —OOCR$_7$, or —OH; $R_6$ is hydrogen or an alkyl having 1 to 10 carbon atoms; $R_7$ is an alkyl having 1 to 10 carbon atoms, an aryl having 6 to 10 carbon atoms (e.g. phenyl, naphthyl, etc.), or a cycloalkyl having 5 to 10 carbon atoms (e.g. cyclohexyl etc.) and the alkyl chain of the groups $R_6$ and $R_7$ may be interrupted with O, N or S and the hydrocarbon group of $R_5$ may be substituted with one or more halogens. In case of using a copolymer of a vinyl halide and a vinylidene halide and/or one or more other copolymerizable monomers, it must be a block copolymer or a graft copolymer so as to form polyene chains having sufficient chain length and it is preferable that the average chain length (polymerization degree) of a polyvinyl halide block or a polyvinylidene halide block in the copolymer is more than 20. When the chain length is less than 20, it is difficult to obtain light-polarizing elements (polyene chains) having enough activity within the visible light range. Further, it is preferable that the molar ratio of a vinyl halide or a vinylidene halide to all structural units of the polymer is 0.1/1 to 1/1, more preferably 0.5/1 to 1/1.

Suitable examples of the block copolymer are as follows (they are shown by monomer structural units wherein "VC" and "VB" stand for vinyl chloride and vinyl bromide, respectively):

VC-vinyl acetate, VC-acrylonitrile, VC-ethylene, VC-propylene, VC-styrene, VC-butadiene, VC-isoprene, VC-vinylidene chloride, VC-acrylic acid, VC-methyl acrylate, VC-methyl methacrylate, VC-ethylene trifluoride, VB-vinyl acetate, VB-acrylonitrile, VB-ethylene, VB-propylene, VB-vinylidene chloride, VB-styrene, VB-acrylic acid, VB-methyl acrylate, VB-methyl methacrylate, VC-vinyl acetate-vinyl alcohol, VC-vinylidene chloride-methyl acrylate, VC-vinyl fluoride-ethylene tetrafluoride, VB-styrene-methyl acrylate, α-chlorovinylbenzene-vinylbenzene, α-chloroacrylonitrileacrylonitrile, α-chloroacrylonitrile-methacrylic acid. Suitable examples of the graft copolymer are polyvinyl chloride graft-copolymerized with methyl methacrylate or styrene, polyvinyl bromide graft-copolymerized with styrene and the like.

These polymers or copolymers capable of formation of polyene chains can be used alone or in a combination thereof.

If necessary, one or more of other polymers and additives such as a stabilizer, a UV absorbing agent, a dye, an antistatic agent and the like can be added to the light-polarizing film.

The thickness of the light-polarizing film used in the present invention is not critical but usually, it is in the range of 1 to 200μ, preferably 5 to 50μ.

The polyacrylate sheet used in the present invention is a non-oriented sheet produced from an acrylate or methacrylate polymer by a usual method such as emulsion casting, solution casting, melt extrusion and the like.

The acrylate or methacrylate polymer used in the present invention is a homopolymer or a copolymer of a monomer of the formula:

(III)

in which $R_8$ is hydrogen or an alkyl having 1 to 10 carbon atoms (preferably hydrogen or methyl); and $R_9$ is an alkyl having 1 to 10 carbon atoms, a cycloalkyl or bicycloalkyl having 5 to 10 carbon atoms (e.g. cyclohexyl, isomenthyl, isobornyl, etc.), an aryl having 6 to 10 carbon atoms (e.g. phenyl, naphthyl, etc.), an aralkyl having 7 to 10 carbon atoms (e.g. benzyl, p-isopropylbenzyl or a heterocyclic group containing one or more hetero atoms selected from O, N and S (e.g. furfuryl, thienyl etc.) and the alkyl chain of the group $R_9$ may be interrupted with O, N or S and the alkyl or aryl group may be substituted with one or more of halogens (e.g. bromine, etc.). Further, the acrylate or methacrylate polymer includes a copolymer of the above monomer (III) and up to 50 mol % (based on all the structural units of the polymer) of another copolymerizable monomer of the formula:

(IV)

in which $R_{10}$ is hydrogen or alkyl having 1 to 10 carbon atoms (preferably, hydrogen or methyl); and $R_{11}$ is a hydrocarbon group having 1 to 10 carbon atoms such as an alkyl having 1 to 10 carbon atoms, an aryl having 6 to 10 carbon atoms (e.g. phenyl, naphthyl, etc.), or a cycloalkyl or bicycloalkyl having 5 to 10 carbon atoms (e.g. cyclohexyl, etc.), a heterocyclic group having one or more hetero atoms selected from O, N and S (e.g. furfuryl, thienyl etc.), —CN, —OH or —OOCR$_{12}$; $R_{12}$ is an alkyl having 1 to 10 carbon atoms and the alkyl chain of the groups $R_{11}$ and $R_{12}$ may be interrupted with O, N, S, or —COO— and the group $R_{11}$ may be substituted with one or more OH or halogens (e.g. bromine, etc.). Examples of the acrylate or methacrylate polymer are homopolymers such as polymethyl methacrylate, polyethyl methacrylate, polypropyl methacrylate, polymethyl acrylate, polyethyl acrylate and the like; bipolymers such as methyl methacrylate-ethyl methacrylate copolymer, methyl methacrylate-propyl methacrylate copolymer, methyl methacrylate-butyl methacrylate copolymer, ethyl methacrylate-propyl methacrylate copolymer, methyl methacrylate-methyl acrylate copolymer, ethyl methacrylate-methyl acrylate copolymer, methyl methacrylate-ethyl acrylate copolymer, methyl acrylatemethyltriglycol acrylate copolymer, methyl methacrylatemethyltriglycol acrylate copolymer, methyl methacrylatestearyl acrylate copolymer, methyl methacrylate-stearyl methacrylate copolymer, ethyl methacrylate-ethyl acrylate copolymer, methyl methacrylate-butyl acrylate copolymer, methyl methacrylate-propyl acrylate copolymer, methyl methacrylate-2-hydroxyethyl methacrylate copolymer, methyl methacrylate-2-hydroxypropyl methacrylate copolymer, ethyl methacrylate-2-hydroxyethyl methacrylate copolymer, ethyl methacrylate-2-hydroxypropyl methacrylate copolymer, methyl methacrylate-2-hydroxyethyl acrylate copolymer, methyl methacrylate-2-hydroxypropyl acrylate copolymer, ethyl methacrylate-2-hydroxyethyl acrylate copolymer, ethyl methacrylate-2-hydroxypropyl acrylate copolymer, methyl methacrylate-tetrahydrofurfuryl acrylate copolymer, methyl methacrylate-tetrahydrofurfuryl methacrylate copolymer, ethyl methacrylate-tetrahydrofurfuryl acrylate copolymer, ethyl methacrylate tetrahydrofurfuryl methacrylate copolymer, methyl methacrylate-benzyl acrylate copolymer, methyl methacrylate-benzyl methacrylate copolymer, methyl methacrylate-benzyl acrylate copolymer, methyl methacrylate-phenoxyethyl acrylate copolymer, methyl methacrylate-phenoxyethyl methacrylate copolymer, methyl methacrylate-cyclohexyl acrylate copolymer, methyl methacrylate-cyclohexyl methacrylate copolymer, methyl methacrylate-glycidyl acrylate copolymer, methyl methacrylate-glycidyl methacrylate copolymer, ethyl methacrylate-tribromophenyl acrylate copolymer, methyl methacrylate-dibromopropyl acrylate copolymer, methyl methacrylate-tropine acrylate copolymer, methyl methacrylate-tropine methacrylate copolymer, methyl acrylate-tropine methacrylate copolymer, ethyl methacrylate-tropine acrylate copolymer, methyl methacrylate-isobornyl methacrylate copolymer, methyl methacrylate-isobornyl acrylate copolymer, ethyl methacrylate-isobornyl methacrylate copolymer, propyl methacrylate-isobornyl methacrylate copolymer, methyl methacrylate-isomenthyl acrylate copolymer, metyl methacrylate-isomenthyl methacrylate copolymer, ethyl methacrylate-isomenthyl methacrylate copolymer, methyl acrylateacrylonitrile copolymer, butyl acrylate-acrylonitrile copolymer, n-propyl acrylate-acrylonitrile copolymer and the like; and terpolymers such as methyl methacrylate-ethyl methacrylate-butyl methacrylate copolymer, methyl methacrylate-ethyl methacrylate-methyl acrylate copolymer, methyl methacrylate-ethyl methacrylate-methyltriglycol acrylate copolymer, methyl methacrylate-ethyl methacrylate-stearyl acrylate copolymer, methyl methacrylate-ethyl methacrylate-stearyl methacrylate copolymer, methyl methacrylate-ethyl methacrylate-tetrahydrofurfuryl acrylate copolymer, methyl methacrylate-ethyl methacrylate-tetrahydrofurfuryl methacrylate copolymer, methyl methacrylate-ethyl methacrylate-benzyl acrylate copolymer, methyl methacrylate-ethyl methacrylate-benzyl methacrylate copolymer, methyl methacrylate-ethyl methacrylate-phenoxyethyl acrylate copolymer, methyl methacrylate-ethyl methacrylate-phenoxyethyl methacrylate copolymer, methyl methacrylate-ethyl methacrylate-cyclohexyl acrylate copolymer, methyl methacrylate-ethyl methacrylate-cyclohexyl methacrylate copolymer, methyl methacrylate-ethyl methacrylate-glycidyl acrylate copolymer, methyl methacrylate-ethyl methacrylate-glycidyl methacrylate copolymer, methyl methacrylate-ethyl methacrylate-tribromophenyl acrylate copolymer, methyl methacrylate-ethyl methacrylate-tribromophenyl methacrylate copolymer, methyl methacrylate-ethyl methacrylate-dibromophenyl methacrylate copolymer, methyl methacrylate-methyl acrylate-benzyl methacrylate copolymer, methyl methacrylate-methyl acrylatecyclohexyl acrylate copolymer, methyl methacrylate-methyl acrylate-glycidyl methacrylate copolymer, methyl methacrylate-methyl acrylate-tribromophenyl methacrylate copolymer and the like. The thickness of the polyacrylate sheet can be varied widely but usually it is in the range of 5 to 10,000μ in view of transparency and workability.

The laminated light-polarizing sheet of the present invention is produced by laminating the polyacrylate sheet on either or both surfaces of the light-polarizing film. The laminating can be carried out by various methods.

For example, the laminating can be carried out by bonding the polyacrylate sheet to the light-polarizing film with an adhesive. Suitable examples of the adhesive to be used are an urethane adhesive (e.g. Adcoat 503-35 produced by Toyo Morton Co., Ltd.), an acrylate adhesive (e.g. SK-Daine 100A, 701, 902 and 1002 produced by Soken Kagaku Co., Ltd.; Rheocoat 1020 produced by Rheochemical Co., Ltd.), a nitrile adhesive (e.g. Cemedaine 210 produced by Cemedaine Co., Ltd.) and the like.

When the surface of the polyacrylate sheet is readily adhesively activated by wetting with a solvent, the laminating can be carried out by wetting the surface of the polyacrylate sheet with a solvent and immediately pressing it on the surface of the light-polarizing film to bond the sheet and the film. For example, when the polyacrylate sheet is made of an alkyl acrylate copolymer which is prepared from predominantly methyl methacrylate or ethyl methacrylate, the sheet can be readily wetted with a solvent such as an alcohol, a ketone, an ester or an ether and bonded to the light-polarizing film to obtain the laminated light-polarizing sheet of the present invention.

The laminating can be also carried out by melt extruding, injection molding or casting-thermosetting the above acrylate or methacrylate polymer on the surface of the light-polarizing film or heat-bonding the polyacrylate sheet to the light-polarizing film. Particularly, when a thick laminated light-polarizing sheet is desired, it is preferable that the laminating is carried out by melt extruding, injection molding or casting-thermosetting the acrylate or methacrylate polymer on the surface of the light-polarizing film. These methods are easily controllable and a hard and thick sheet can be obtained in a short time. Moreover, the resulting laminated light-polarizing sheet has an optical uniformity and excellent mechanical properties since little wrinkling and bubble are produced in these methods.

The laminated light-polarizing sheet of the present invention can be used as it is in various fields, but it may be laminated either or both surfaces thereof with another sheet material in order to reinforce, by which any damage of the sheet by external force (e.g. bending) can be prevented and further a heat deterioration can be reduced.

Examples of the another sheet material are the same or a different kind of the above polyacrylate sheet as well as a polyester sheet such as polyethylene terephthalate-isophthalate sheet, polybutylene terephthalate sheet, poly(ethylene-diethylene)telephthalate sheet; a polycarbonate sheet such as poly(4,4'-diphenylpropane)carbonate sheet; a polyamide sheet such as nylon 6 sheet, nylon 66 sheet, nylon 6-nylon 66 sheet, polyxylylene azipamide sheet; a polyolefin sheet such as polyethylene sheet, polypropylene sheet, polybutene-1-sheet; a polyvinyl sheet such as polystyrene sheet, polyvinyl chloride-vinylidene chloride sheet; a cellulose sheet such as cellulose acetate sheet, cellulose triacetate sheet; glass and the like. The laminating can be carried out by bonding the sheet material to the surface of the laminated light-polarizing sheet with an adhesive or a pressure sensitive adhesive or by casting a solution or a melt of the above sheet material on the surface of the laminated light-polarizing sheet. Alternatively, the sheet material can be heat-bonded to or injected on the surface of the polyacrylate sheet layer of the laminated light-polarizing sheet.

The laminated light-polarizing sheet thus obtained has a light resistance since the polyacrylate sheet has UV screening properties. However, in some cases that more improved light resistance is required in order to prevent photo-deterioration of the laminated light-polarizing sheet, it is preferable to give light filter properties to the light-polarizing film layer or another layer of the laminated light-polarizing sheet, or if any, the adhesive layer, so that at least one of these layers has a light transmittance of not less than 60% within the wavelength range of 500 to 800 mμ and of not more than 10% within the wavelength range of 230 to 420 mμ.

The light filter properties can be provided by treating the polyacrylate sheet in a solution of a yellow dye having a maximum light absorption around 400 mμ and a UV absorber at a temperature from room temperature to the softening point of the polymer thereof for several seconds to several ten minutes, washing with water (or removing a solvent) and then drying. Alternatively, the yellow dye and the UV absorber may be admixed with the materials of the polyacrylate sheet, the light-polarizing film or the adhesive before forming the sheet, film or adhesive layer.

Suitable examples of the yellow dye having a maximum light absorption around 400 mμ are a disperse dye such as C.I. Disperse Yellow 17 and the like, a direct dye such as Direct Fast Yellow 5G ®, C.I. Direct Yellow 17, C.I. Direct Yellow 20 and the like. These dyes can be used alone or in a combination thereof. When the polyacrylate sheet is treated in a solution, the solution has preferably a concentration of the yellow dye of 0.1 to 5 parts by weight per 100 parts by weight of the solvent.

The UV absorber has preferably a light absorption capacity over a wide wavelength range toward long wavelength. Suitable examples of the UV absorber are a benzophenone derivative such as 2,2'-dihydroxy-4,4'-dimethoxybenzophenone, 2,2',4,4'-tetrahydroxybenzophenone and the like. These UV absorbers can be used alone or in combination thereof. When the polyacrylate sheet is treated in a solution, the solution has preferably a concentration of the UV absorber of 0.1 to 10 parts by weight per 100 parts by weight of the solvent.

When the yellow dye and the UV absorber are admixed with the materials of the polyacrylate sheet, light-polarizing film or adhesive, the amount of the dye and the UV absorber vary with thickness of the sheet, film or adhesive layer, but, usually it is preferable to use 0.05 to 5 parts by weight of the dye and 0.05 to 10 parts by weight of the UV absorber per 100 parts by weight of the materials.

Examples of the solvent for the dye and the UV absorber are an alcohol such as methanol, ethanol, butanol and the like; an ether such as methyl cellosolve, ethyl cellosolve, methyl carbitol, ethyl carbitol and the like; a glycol such as ethylene glycol, diethylene glycol and the like; an ester such as ethyl acetate, methyl acetate and the like.

The laminated light-polarizing sheet of the present invention can be suitably used in a liquid crystal display device of watches, electric computers and other various instruments. The laminated light-polarizing sheet can also be used in other various fields such as sunvisors, displays, interior decorations and the like.

Besides, in the production of a liquid crystal display, it is necessary to bond the laminated light-polarizing sheet of the present invention to a liquid crystal cell, a reflex plate and the like. Therefore, it is convenient to provide a pressure sensitive adhesive layer on either or both surfaces of the laminated light-polarizing sheet and/or a reflex plate on either surface of the laminated light-polarizing sheet. These laminated light-polarizing sheets having pressure sensitive adhesive layers and/or a reflex plate are also included in the scope of the present invention.

Examples of the pressure sensitive adhesive are a natural rubber, a synthetic rubber elastomer, vinyl chloride-vinyl acetate copolymer, polyvinyl alkyl ether, polyalkyl acrylate and the like. Usually, the thickness of the pressure sensitive adhesive layer is about 5 to about 30μ. It is preferable that the surface of the pressure sensitive adhesive layer is covered by a release paper or film.

As the reflex plate, a thin plate of 10 to 100μ in thickness plated with gold, silver, copper, aluminum, chrome and the like can be used. A plastic film deposited with a metal can also be used as the reflex plate. It is useful to deposit a metal on a plastic film having uneven surface since the resulting deposited film becomes a non-directional reflex plate. Further, the function as the reflex plate can be provided by depositing a metal such as aluminum on either surface of the polyacrylate sheet layer of the laminated lightpolarizing sheet. In this case, the thickness of the deposit is about 50 to 3,000 Å.

Examples of the construction of the laminated light-polarizing sheet are as follows (wherein 1 is the light-polarizing film layer, 2 is an adhesive layer, 3 is the polyacrylate sheet layer, 4 is another transparent sheet material layer, 5 is the pressure sensitive adhesive layer, 6 is the reflex plate layer, and 7 is the release film layer):

(1) The laminated light-polarizing sheet comprising the light-polarizing film layer and the polyacrylate sheet layer:
1/3, 3/1/3, 1/2/3, 3/2/1/2/3, 3/2/1/2/4, 4/3/2/1/2/3/4

Figure 2:
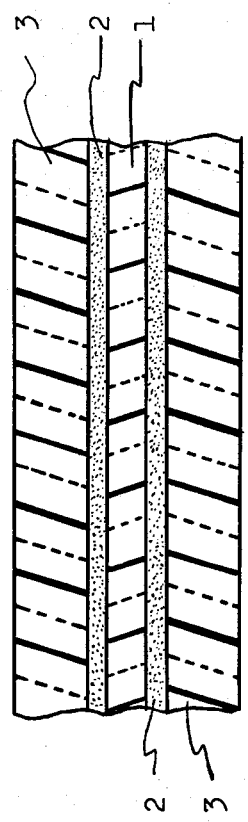
FIG. 2 shows a schematic sectional view of one embodiment of the laminated light-polarizing sheet of the present invention.

The accompanying FIG. 2 shows a schematic sectional view of one embodiment of the laminated light-polarizing sheet of the present invention, i.e. in the case of the structure of 3/2/1/2/3/, wherein the numerals 1, 2 and 3 are as defined above.

(2) The laminated light-polarizing sheet comprising the light-polarizing film layer, the polyacrylate sheet layer and the pressure sensitive adhesive layer:
7/5/1/3, 7/5/1/2/3, 7/5/1/2/3/5/7, 7/5/3/1/3, 7/5/3/2/1/2/3, 7/5/3/2/1/2/3/5/7

(3) The laminated light-polarizing sheet comprising the light-polarizing film layer, the polyacrylate sheet layer and the reflux plate layer:

6/2/1/3, 6/5/1/3, 6/5/1/2/3, 6/2/1/2/3, 6/2/1/3/5/7, 6/5/1/2/3/5/7, 6/2/1/2/3/5/7, 6/5/3/2/1/2/3, 6/2/3/2/1/2/3, 6/5/3/2/1/2/3/5/7, 6/2/3/2/1/2/3/5/7.

The following examples illustrate the present invention but are not to be construed as limiting the scope thereof.

EXAMPLE 1

(a) An adhesive solution of the following composition was coated on one surface of a polyethylene terephthalate release film (50 μ) with a doctor knife (gap: 4/1,000 inch) and dried on a metal frame at 80° C. for 2 minutes in a hot-air drying chamber. The coating weight was 12.4 g/m².

| Composition of the adhesive solution | |
|---|---|
| Acrylic adhesive (SK-Daine 701) | 10 parts by weight |
| Curing agent | 0.0022 parts by weight |
| Ethyl acetate | 90 parts by weight |

A polyacrylate sheet produced from methyl methacrylate-ethyl acrylate copolymer was bonded to the surface of the adhesive layer on the film at 50° C. for 2 seconds under a pressure of 2.0 kg/cm². After removing the release film, a polyene-containing light-polarizing film produced by partial dehydrohalogenation of polyvinyl chloride (20 μ) was bonded to the adhesive layer on the polyacrylate sheet at 60° C. for 5 seconds under a pressure of 2.0 kg/cm² to obtain a laminated light-polarizing sheet (construction: 3/2/1).

(b) The surface of the light-polarizing film layer of the above-obtained laminated light-polarizing sheet (opposite face to the polyacrylate sheet-bonding surface) was bonded to an adhesive layer which is formed on another polyacylate sheet produced by the same procedure in the above (a) at 60° C. for 5 seconds under a pressure of 2.0 kg/cm² to obtain a laminated light-polarizing sheet, both surfaces of which are laminated with a polyacrylate sheet (construction: 3/2/1/2/3).

(c) A pressure sensitive adhesive layer covered by a release film was provided on one surface of the laminated light-polarizing sheet obtained in the above (b) in the following manner.

A pressure sensitive adhesive solution of the following composition was coated on one surface of a polyethylene terephthalate release film (50 μ) with a doctor knife (gap: 4/1,000 inch) and dried on a metal frame at 80° C. for 2 minutes in a hot-air drying chamber, by which the pressure sensitive composition was coated in an amount of 11.0 g/m².

| Acrylate pressure sensitive adhesive (SK-Daine 100B) | 10 parts by weight |
|---|---|
| Ethyl acetate | 26 parts by weight |

To the surface of the pressure sensitive adhesive layer thus formed was further bonded the laminated lightpolarizing sheet produced in the same manner as in the above (b) at 60° C. for 2 seconds under a pressure of 2.0 kg/cm² to obtain a laminated light-polarizing sheet (construction: 7/5/3/2/1/2/3).

(d) For comparative purpose, according to the same procedures as in the above (a) to (c), to both surfaces of the polyene-containing light-polarizing film (20 μ) were bonded cellulose triacetate films (Fujitac produced by Fuji Film Co., Ltd., 50 μ) with the above adhesive solution and one surface thereof was provided with a pressure sensitive adhesive layer covered by the release film to obtain a laminated light-polarizing sheet.

These laminated light-polarizing sheets were cut into a piece of 1.5 cm×2.0 cm and carefully bonded to liquid crystal cells. These cells were allowed to stand at 60° C. for 20 hours under 90% RH. The cellulose film-laminated light-polarizing sheet of (d) crazed along the stretching direction of the light-polarizing film layer thereof and bubbles were observed between the cell and the pressure sensitive adhesive layer thereof. To the contrary, the polyacrylate sheet-laminated light-polarizing sheets of (a) to (c) did not craze and no bubble was observed.

EXAMPLE 2

A pressure sensitive adhesive solution of the following composition was coated on one surface of a polyethylene terephthalate release film (50 μ) and dried at 80° C. for 2 minutes. The pressure sensitive adhesive composition was coated in an amount of 11.0 g/cm².

| Acrylate pressure sensitive adhesive (SK-Daine 100B) | 10 parts by weight |
|---|---|
| Ethyl acetate | 26 parts by weight |

To the surface of the adhesive layer of the film obtained above was bonded the light-polarizing film layer of the laminated light-polarizing sheet obtained in Example 1 (a) at 60° C. for 2 seconds under a pressure of 2.0 kg/cm² to obtain a laminated light-polarizing sheet (construction: 3/2/1/5/7).

The laminated light-polarizing sheet thus obtained had an excellent adhesion workability.

EXAMPLE 3

(a) An adhesive solution (A) having a light filter activity of the following composition was coated on one surface of a polyethylene terephthalate release film (50 μ) and dried at 60° C. for 2 minutes. The adhesive solution was coated in an amount of 9.7 g/m².

| Composition of the adhesive solution (A) | |
|---|---|
| Urethane adhesive (Adcoat 503-35 | 50 parts by weight |
| Yellow dye (C.I. Disperse Yellow 60) | 0.125 parts by weight |
| UV absorber (2,2',4,4'-tetrahydroxy-benzophenone) | 1.5 parts by weight |
| Ethlyl acetate | 25 parts by weight |
| Methyl ethyl ketone | 25 parts by weight |

A polyacrylate sheet produced from methyl methacrylate-ethyl acrylate copolymer was bonded to the surface of the adhesive layer on the film obtained above at 60° C. for 2 seconds under a pressure of 2.0 kg/cm². The thus obtained laminate had a light transmittance of not less than 85% within the visible light wavelength range of more than 425 mμ and not more than 10% within the wavelength range of 230 to 390 mμ as shown in the light transmittance curve of the accompanying FIG. 1.

After removing the polyethylene terephthalate release film, to the adhesive layer of the resulting polyacrylate sheet was bonded a polyene-containing light-polarizing film produced by partial dehydrohalogenation of polyvinyl chloride (20 μ) at 85° C. for 5 seconds under a pressure of 2.0 kg/cm² to obtain a laminated light-polarizing sheet bonded with a polyacrylate sheet layer having light filter properties on one surface of the light-polarizing film.

(b) In the same manner as described in the above (a), another polyacrylate sheet having an adhesive layer was formed by using an adhesive solution (B) of the following composition.

| Composition of the adhesive solution (B) | |
| --- | --- |
| Urethane adhesive (Adcoat 503-35) | 50 parts by weight |
| Methyl ethyl ketone | 25 parts by weight |
| Ethyl acetate | 25 parts by weight |

The surface of the light-polarizing film layer of the laminated light-polarizing sheet obtained in (a) was bonded to the surface of the adhesive layer of the polyacrylate sheet obtained above at 60° C. for 5 seconds under a pressure of 2.0 kg/cm² to obtain a laminated light-polarizing sheet having the polyacrylate sheet layer on both surfaces of the light-polarizing film.

(c) In the same manner as described in Example 1 (c), to the surface of the layer of the adhesive solution (B) of the laminated light-polarizing sheet obtained in the above (b) was provided with a layer of a pressure sensitive adhesive in the following manner.

That is, the same pressure sensitive adhesive solution is used in Example 1 (c) was coated on one surface of a polyethylene terephthalate release film (50 μ) with a doctor knife (gap: 4/1,000 inch) and dried on a metal frame at 80° C. for 2 minutes in a hot-air drying chamber (the coated amount of the pressure sensitive adhesive: 11.0 kg/cm²).

To the surface of the pressure sensitive adhesive layer thus formed was bonded the laminated light-polarizing sheet obtained in the above (b) at 60° C. for 2 seconds under a pressure of 2.0 kg/cm² to obtain a laminated light-polarizing sheet having light filter properties (construction: 7/5/3/2/1/2/3).

The laminated light-polarizing sheet thus obtained was cut into a piece of 2 cm×7 cm and bonded to a liquid crystal cell. The cell was allowed to stand at 70° C. under 95% RH and no damage such as crazing was observed even if after 100 hours. Further, the cell was exposed to a xenon fadeometer for 100 hours but display performance thereof hardly changed as shown in the following table.

| | Before exposure | After exposure |
| --- | --- | --- |
| $H_0$ | 39% | 42% |
| $H_{90}$ | 17% | 21% |

($H_o$ is the average percent light transmitted with the polarization axes parallel. $H_{90}$ is the average percent light transmitted with the polarization axes crossed. The light transmittance was measured within the wavelength range of 400 to 700 mμ at intervals of 10 mμ.)

EXAMPLE 4

The surface of the light-polarizing film layer of the laminated light-polarizing sheet obtained in Example 3 (a) was bonded to an adhesive layer formed on a cellulose triacetate film (Fujitac produced by Fuji Film Co., Ltd. 50 μ), said adhesive layer being formed by the same procedure as in Example 3 (a) using the adhesive solution (B), at 60° C. for 3 seconds under a pressure of 2.0 kg/cm² to obtain a laminated light-polarizing sheet having the polyacrylate sheet layer and the cellulose triacetate film layer on each surface of the light-polarizing film (construction: 3/2/1/2/4). The laminated light-polarizing sheet was allowed to stand at 75° C. for 10 days under 95% RH but no crazing and no charge were observed.

EXAMPLE 5

According to the same procedure in Example 1 (a), a polyacrylate sheet layer produced from methyl methacrylate-ethyl acrylate copolymer was bonded to a polyene-containing light-polarizing film produced by partial dehydrohalogenation of polyvinyl chloride to obtain a laminated light-polarizing sheet (construction: 3/2/1). The surface of the light-polarizing film layer of the laminated light-polarizing sheet was bonded to an adhesive layer on an aluminum reflex plate (20 μ, reflectance: 85%) (formed by coating the same adhesive solution as used in Example 1 on the aluminum plate) at 60° C. for 2 seconds under a pressure of 1.5 kg/cm² to obtain a laminated light-polarizing sheet having a reflex plate layer (construction: 3/2/1/2/6).

EXAMPLE 6

The release film of the laminated light-polarizing sheet obtained in Example 2 was removed. An aluminum reflex plate (20 μ, reflectance: 85%) washed with acetone at several times was pressed onto the pressure sensitive adhesive layer of the laminated light-polarizing sheet at room temperature for 2 seconds under a pressure of 2.0 kg/cm² to obtain a laminated light-polarizing sheet having a reflex plate layer (construction: 3/2/1/5/6).

EXAMPLE 7

A polyvinyl chloride was partially dehydrohalogenated to obtain a polyene-containing film. The film was stretched in one direction to obtain a light-polarizing film.

A methyl methacylate-methyl acrylate copolymer (molar ratio of copolymerization: 50 : 50) was molten and extruded through a slit to obtain a non-oriented sheet of 20 μ in thickness.

The above-obtained light-polarizing film and the polyacrylate sheet thus obtained were bonded with an acrylate adhesive (SK-Daine 1000A) as shown in the accompanying FIG. 2 (which is the cross section of the laminate in which 1 is the light-polarizing film, 2 is the adhesive layer (thickness: 5 μ) and 3 is the polyacrylate sheet layer) to obtain a laminated light-polarizing sheet (construction: 3/2/1/2/3).

The laminated light-polarizing sheet was fixed in a metal frame die and the die was closed with a cover plate. A molten acrylate resin (Delpet, produced by Asahi Kasei Co., Ltd.) was injected into the die through a nozzle of an extruded (produced by Nippon Seiko Co., Ltd.; die being cooled with water, cylinder temperature: 180° to 220° C., nozzle temperature: 220° C., sum of injection time and curing time: 10 seconds, injection pressure: 100 kg/cm², back pressure: 20 kg/cm²) to obtain a laminated light-polarizing sheet of 2 mm in thickness (construction: 3/2/1/2/3/4).

The laminated light-polarizing sheet thus obtained had an excellent polarization efficiency and a bright field of view. Each layer of the sheet had an excellent bond strength. Further, when the sheet was allowed to stand at 80° C. under 95% RH, no damage such as crazing was observed.

EXAMPLE 8

An acrylate adhesive (SK-Daine 701) was coated on one surface of a polyethylene terephthalate release film with a doctor knife and dried at 80° C. for 2 minutes. An polyacrylate sheet produced from methyl methacrylate-butyl methacrylate copolymer (m.p. 70° C.) was bonded to the adhesive layer on the film obtained above at 50° C. for 2 seconds under a pressure of 2.0 kg/cm². After removing the release film, a polyene-containing light-polarizing film produced form polyvinyl chloride (20 μ) was bonded to the adhesive layer of the above-obtained polyacrylate sheet at 60° C. for 5 seconds under a pressure of 2.0 kg/cm² to obtain a laminated light-polarizing sheet.

The surface of the light-polarizing film layer of the above-obtained laminated light-polarizing sheet was heat-bonded to a hard transparent polyvinyl chloride sheet (500 μ) at 120° C. for about 10 minutes under a pressure of 60 kg/cm² to obtain a laminated light-polarizing sheet having excellent polarization efficiency and light transmittance (construction: 3/2/1/4).

What is claimed is:

1. A laminated light-polarizing sheet comprising a light-polarizing film of a halogenated vinyl or vinylidene polymer containing polyene chains formed by partial dehydrohalogenation, said chains being oriented by stretching, and a film or sheet of an acrylate of methacrylate polymer laminated on at least one surface of the light-polarizing film.

2. A laminated light-polarizing sheet according to claim 1, wherein the film or sheet is laminated on the surface of the light-polarizing film with an adhesive.

3. A laminated light-polarizing sheet according to claim 1, wherein the film or sheet is directly laminated on the surface of the light-polarizing film.

4. A laminated light-polarizing sheet according to claim 1, wherein said sheet has a light transmittance of not less than 60% within the wavelength range of 500 to 800 mμ and of not more than 10% within the wavelength range of 230 to 420 mμ.

5. A laminated light-polarizing sheet according to claim 1, wherein a pressure sensitive adhesive layer covered by a release film is further provided on at least one surface of the laminated light-polarizing sheet.

6. A laminated light-polarizing sheet according to claim 1, wherein a reflex plate is further laminated on either surface of the laminated light-polarizing sheet.

7. A laminated light-polarizing sheet according to claim 6, wherein a pressure sensitive adhesive layer covered by a release film is further provided on at least one surface of the laminated light-polarizing sheet.

8. A laminated light-polarizing sheet according to claim 1, wherein the film or sheet is that of a homopolymer or a copolymer of a monomer of the formula:

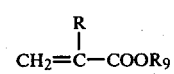

in which R is hydrogen or an alkyl group having 1 to 10 carbon atoms; and $R_9$ is an alkyl group, a halosubstituted alkyl group or an alkyl group whose chain is interrupted with O, N, or S, each alkyl group having 1 to 10 carbon atoms, a cycloalkyl or bicycloalkyl group having 5 to 10 carbon atoms, an aryl group or halosubstituted aryl group having 6 to 10 carbon atoms, an aralkyl group having 7 to 10 carbon atoms or a heterocyclic group containing one or more hetero atom selected from O, N and S.

9. A laminated light-polarizing sheet according to claim 1, wherein the film or sheet is that of a copolymer of the monomer of the formula:

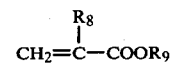

in which $R_8$ is hydrogen or an alkyl having 1 to 10 carbon atoms; and $R_9$ is an alkyl group, a halosubstituted alkyl group or an alkyl group whose chain is interrupted with O, N, or S, each alkyl group having 1 to 10 carbon atoms, a cycloalkyl or bicycloalkyl group having 5 to 10 carbon atoms, an aryl group or halosubstituted aryl group having 6 to 10 carbon atoms, an aralkyl group having 7 to 10 carbon atoms or a heterocyclic group containing one or more hetero atom selected from O, N and S; said copolymer containing up to 50 mol % (based on all the structural units of the polymer) of another copolymerized copolymerizable monomer of the formula:

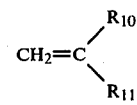

in which $R_{10}$ is hydrogen or an alkyl group having 1 to 10 carbon atoms; and $R_{11}$ is an unsubstituted, hydroxyl substituted or halogen substituted alkyl group or alkyl group interrupted by O, N or S, each having 1 to 10 carbon atoms, aryl group having 6 to 10 carbon atoms, cycloalkyl or bicycloalkyl group having 5 to 10 carbon atoms, or heterocyclic group having at least one hetero atom selected from O, N and S; —CN, —OH or —OOCR$_{12}$; where $R_{12}$ is an alkyl group or aN alkyl group interrupted with O, N, S, or —COO—, each having 1 to 10 carbon atoms.

10. A laminated light-polarizing sheet according to claim 8 wherein $R_9$ is alkyl.

11. A laminated light-polarizing sheet according to claim 8 wherein $R_8$ and $R_9$ are halogen substituted alkyl or aryl.

12. A laminated light-polarizing sheet according to claim 9 wherein $R_9$ is alkyl.

13. A laminated light-polarizing sheet according to claim 9 wherein the alkyl and aryl groups are halogen substituted.

* * * * *